(12) United States Patent
Rizk et al.

(10) Patent No.: US 11,934,787 B2
(45) Date of Patent: Mar. 19, 2024

(54) INTENT DETERMINATION IN A MESSAGING DIALOG MANAGER SYSTEM

(71) Applicant: International Business Machines Corporation, Armonk, NY (US)

(72) Inventors: Yara Rizk, Cambridge, MA (US); Shubham Agarwal, Cambridge, MA (US); Yasaman Khazaeni, Needham, MA (US); Calvin Phung, La Puente, CA (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 17/243,694

(22) Filed: Apr. 29, 2021

(65) Prior Publication Data
US 2022/0350970 A1    Nov. 3, 2022

(51) Int. Cl.
*G06F 40/279*    (2020.01)
*G06F 18/22*    (2023.01)
(Continued)

(52) U.S. Cl.
CPC .............. *G06F 40/30* (2020.01); *G06F 18/22* (2023.01); *G06F 40/279* (2020.01); *G06N 20/00* (2019.01); *H04L 51/04* (2013.01)

(58) Field of Classification Search
None
See application file for complete search history.

(56) References Cited

U.S. PATENT DOCUMENTS

| | | | |
|---|---|---|---|
| 7,778,820 B2 | 8/2010 | Horvitz | |
| 7,917,367 B2 | 3/2011 | Di Cristo | |

(Continued)

FOREIGN PATENT DOCUMENTS

| | | |
|---|---|---|
| CN | 115269827 A | 11/2022 |
| JP | 2022171624 A | 11/2022 |

(Continued)

OTHER PUBLICATIONS

Authors et al.: Disclosed Anonymously, "A Method and System for Ensemble Decision Making for a Goal-Driven Dialog Assistant", An IP.com Prior Art Database Technical Disclosure, IP.com No. IPCOM000264768D, IP.com Electronic Publication Date: Jan. 25, 2021, 6 Pages.

(Continued)

*Primary Examiner* — Quynh H Nguyen
(74) *Attorney, Agent, or Firm* — Mochai Chuaychoo

(57) ABSTRACT

Computer-implemented methods, computer program products, and computer systems for improving intent determination in a messaging dialog manager system. The computer-implemented method for improving intent determination in a messaging dialog manager system may include one or more processors configured for receiving first agent entry data corresponding to a first agent communicating in a messaging dialog interface, determining that the first agent entry data expects a response that is within a first response domain, determining that a first user entry entered in the messaging dialog interface is not within the first response domain. Further, the computer-implemented may include identifying a second agent configured with a second response domain that includes the first user entry and transmitting the first user entry to the second agent to facilitate a seamless transition of an established communicational flow between the first agent and a first user.

19 Claims, 5 Drawing Sheets

(51) Int. Cl.
  *G06F 40/30* (2020.01)
  *G06N 20/00* (2019.01)
  *H04L 51/04* (2022.01)

(56) References Cited

U.S. PATENT DOCUMENTS

| | | | |
|---|---|---|---|
| 9,798,719 B2 | 10/2017 | Karov | |
| 10,021,245 B1* | 7/2018 | Koster | H04M 3/5133 |
| 10,366,168 B2 | 7/2019 | Wu | |
| 10,460,215 B2 | 10/2019 | Herold | |
| 10,614,799 B2 | 4/2020 | Kennewick, Jr. | |
| 10,621,478 B2 | 4/2020 | Albadawi | |
| 10,810,378 B2 | 10/2020 | Podgorny | |
| 11,057,476 B2* | 7/2021 | Lebedev | H04L 67/145 |
| 2014/0337266 A1 | 11/2014 | Kalns | |
| 2019/0042908 A1* | 2/2019 | Garcia | G06N 3/006 |
| 2020/0210649 A1 | 7/2020 | Lewis | |

FOREIGN PATENT DOCUMENTS

| | | |
|---|---|---|
| WO | 2014015267 A2 | 1/2014 |
| WO | 2017165040 A1 | 9/2017 |

OTHER PUBLICATIONS

Authors et al.: Disclosed Anonymously, "Adapting conversation based on perceived user expertise", An IP.com Prior Art Database Technical Disclosure, IP.com No. IPCOM000258019D, IP.com Electronic Publication Date: Apr. 1, 2019, 5 Pages.

Authors et al.: Disclosed Anonymously, "Method and System for Providing Multi-layer Intent Representation and Automatic Conversation Generation Using Machine Learning", An IP.com Prior Art Database Technical Disclosure, IP.com No. IPCOM000255711D, IP.com Electronic Publication Date: Oct. 11, 2018, 5 Pages.

Deloitte Digital, "Adopting the Power of Conversational UX Chatbots", Deloitte Digital, 2017, 24 Pages.

John et al., "Ava: From Data to Insights Through Conversation", 8th Biennial Conference on Innovative Data Systems Research (CIDR '17), Chaminade, California, USA, Jan. 8-11, 2017, 10 Pages.

Maccartney, Bill, "Understanding Natural Language Understanding", ACM SIGAI Bay Area Chapter Inaugural Meeting, Jul. 16, 2014, 72 Pages.

Schank, Roger C., "Finding the Conceptual Content and Intention in an Utterance in Natural Language Conversation", Session No. 10 Computer Understanding I (Communication), 2019, 11 Pages.

\* cited by examiner

INTENT DETERMINATION IN A MESSAGING DIALOG MANAGER SYSTEM

BACKGROUND

The present invention relates generally to the field of data processing, and more particularly to improving intent determination in a messaging dialog manager system.

Conversational agents are becoming an increasingly popular online method for product and service providers to interact with their customers and users. Conversational agents are a form of software agent and may be referred to as chatbots, chatterbots, Artificial Conversational Entities, smart assistants, chat robots, or other such terms. A conversational agent is a system that mimics conversation, either by voice or text, with a user so as to provide the user with information and services and also solicit and receive information from the user. The objective is for a conversational agent to accurately understand a user query and to respond accordingly. For example, a conversational agent may receive a user query, determine the intent and purpose of the user query, and return a relevant response or perform a task or action.

However, conversational agents still suffer from multiple limitations that hinder their widespread adoption. One crucial capability is identifying the intents behind message entries (e.g., utterances, text), namely whether statements are inquiring about information or providing information. Identifying intents behind message entries can significantly improve the agent's decision making when experiencing unexpected responses from the user.

A conversational agent is typically designed for a limited number of use cases, in many cases a single use case. For example, users may ask a weather conversational agent for a weather forecast, book tickets for travel or entertainment by accessing the conversational agent for the relevant supplier, purchase products from retailers, and record information such as receipts with an accounting system conversational agent. Conversational agents allow users to interact with product and service providers in a simple and intuitive manner.

SUMMARY

During a chatbot session with a user, a user may provide an ambiguous utterance that the chatbot may not be able to discern whether the utterance is a question or a statement. When machines and humans interact, especially in natural language, misunderstandings could lead to severe consequences. Identifying the intent behind specific interactions such as when one phrase (e.g., via an agent or an entity) is providing information versus asking for information is important to avoid ambiguous statements that could lead to unforeseen effects.

The present disclosure addresses the above-identified shortcomings. Embodiments of the present invention disclose a computer-implemented method, a computer program product, and a computer system for improving intent determination in a messaging dialog manager system. The computer-implemented method for improving intent determination in a messaging dialog manager system may include one or more processors configured for receiving first agent entry data corresponding to a first agent communicating in a messaging dialog interface; determining that the first agent entry data expects a response that is within a first response domain; determining that a first user entry entered in the messaging dialog interface is not within the first response domain; identifying a second agent configured with a second response domain that includes the first user entry; and transmitting the first user entry to the second agent to facilitate a seamless transition of an established communicational flow between the first agent and a first user communicating in the messaging dialog interface.

In an embodiment, the computer-implemented method may further include identifying agent text data corresponding to a natural language (NL) text in the first agent entry data; and identifying user text data corresponding to a NL utterance in the first user entry.

In an embodiment, the computer-implemented method may further include determining a first agent data entry topic based on the agent text data, wherein the first response domain corresponds to the first agent data entry topic; determining a first user entry topic based on the user text data; and comparing the first agent data entry topic and the first user entry topic to determine a similarity threshold is met.

In an embodiment, the computer-implemented method may further include determining that the first user entry is not within the first response domain is based at least on determining that the similarity threshold does not exceed a predetermined value.

In an embodiment, the computer-implemented method may further include processing, by a first trained machine learning model, the agent text data to generate model output data corresponding to a response expectation classification; and determining the NL text as the first agent entry data that expects the response if the response expectation classification satisfies a condition.

In an embodiment, the first user entry may include a document entry, wherein the computer-implemented method may further include extracting document entry data from the document entry; and processing the document entry data to determine natural language text data, wherein determining that the first user entry is not within the first response domain is based at least on the natural language text data.

In an embodiment, transmitting the first entry to the second agent may correspond to a digressed conversational flow between the first user and the second agent in the messaging dialog interface.

In an embodiment, determining that the first agent entry expects a response may further include appending parts of speech (POS) tags to one or more words in the NL text to generate tagged NL text data; encoding the agent text data into sentence embeddings having a dimension of 768 or less; processing, by a second trained machine learning model, the tagged NL text data and the sentence embeddings to generate model output data corresponding to a response expectation classification; and determining the NL text as the first agent entry data that expects the response if the response expectation classification satisfies a condition.

DETAILED DESCRIPTION

Figure 1:
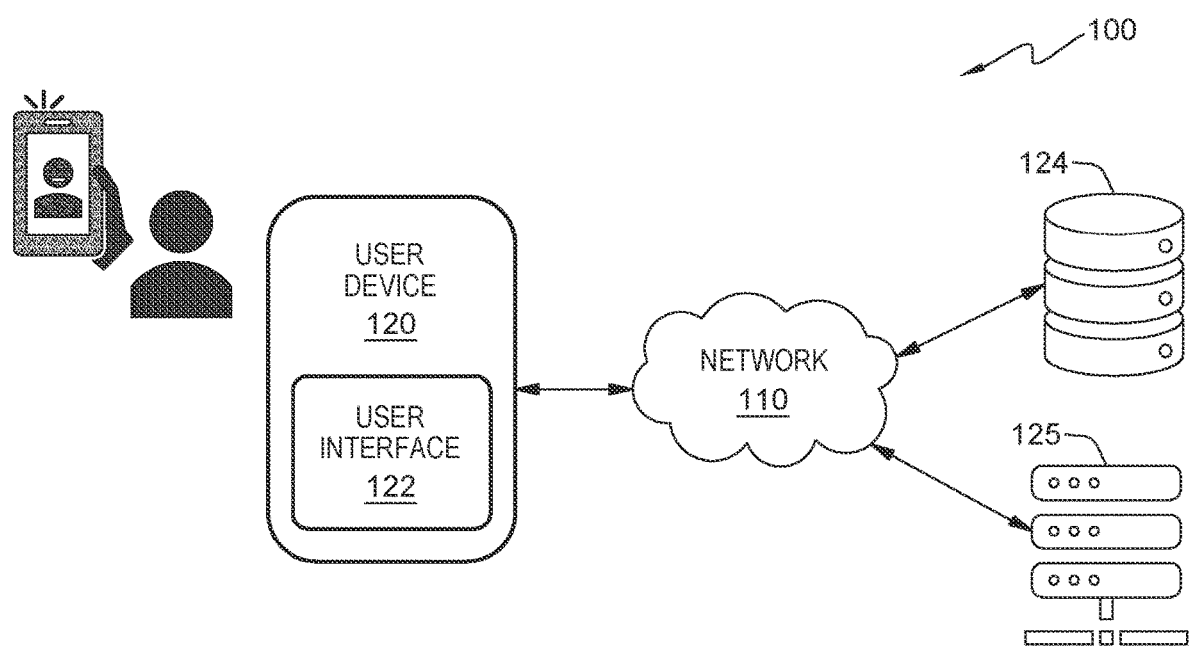
FIG. 1 depicts a block diagram of a distributed data processing environment for improving intent determination in a messaging dialog system, in accordance with an embodiment of the present invention.

Embodiments of the present invention describe computer-implemented methods, systems, and computer program products for improving intent determination in a messaging dialog manager system. As described herein, a data driven machine learning approach is provided to identify interrogative, imperative, and declarative statements by compiling a labeled dataset of English sentences and training multiple models on sentence embeddings and syntactic features. Natural language interaction is a difficult task for machines to master because natural language utterances can be highly unstructured, and their content can vary widely. Ambiguous or unclear statements, speakers haphazardly digressing or moving away from an incomplete conversation, and other common user behaviors add to the challenge of machines conversing with humans.

Focusing on natural language understanding, its goal is to comprehend a natural language utterance ranging from the syntactic composition and the roles of words in a sentence to its semantic meaning, context, and other tasks. Embodiments described herein focus on the task of identifying specific grammatical sentence structures in a dialog setting, notable interrogative, and imperative sentences (versus those that are not). Identifying the type of sentence is useful for conversational agents in multiple scenarios. For example, identifying statements that are awaiting a response (i.e., interrogative and imperative statements) allows chatbots to determine whether digression occurs when the statement is not addressed or responded to appropriately.

Also, in multi-agent chatbot settings, identifying the type of statements can contribute to the decision process of a dialog manager, an entity that handles responses, conversation turns, context, and other dialog artifacts. Finally, classifying a sentence or data entry allows conversational agents (embodied or virtual) to determine when they are the givers of information and when they are the receivers of information. This determination may be provided to the dialog manager to update a corresponding knowledge base configured to facilitate seamless transitions between different topics within an ongoing communication session.

Embodiments described herein provide computer-implemented methods configured to train a machine learning model to identify natural language utterances that expect a response (e.g., "Who are the top 5 banks" and "Get the names of the top 5 banks") vs. those that do not expect a response (e.g., "The following banks are in the top 5."). Unlike performing intent recognition that also takes into account the domain of the request, this classification may be domain independent. For example, a dataset of natural language statements in a particular language (e.g., English) may be compiled from existing benchmarks in the literature and the dataset may be labeled based on the two classes (i.e., expects response, expects no response). Further, machine learning models (e.g., shallow, deep learning) may be trained on various features including sentence embeddings and syntactic features. As a result, a specific natural language task and identification of its importance in messaging dialog systems are defined and contributed to the embodiments described herein. Further, embodiments described herein include labeled collections of sentences and a machine learning model that has learned the classification task.

Embodiments described herein may be applied to both user utterances or conversational agent-generated responses, wherein digression in conversations may be identified based at least on determining whether a message entered in a messaging dialog system expects a response or not. In a multi-turn goal-oriented conversational agent system, the flow of dialog can be visualized as a branch traversal from root to leaves in a dialog tree. In a multi-turn conversation, the flow may involve hopping between many branches as a user digresses from one topic to another. Understanding when an utterance expects a response helps determine whether a conversation should continue along a branch or is digressing instead.

Embodiments described herein provide a machine learning model that captures a sentence's syntactic structure and overall meaning, identifying its property of expecting a response or otherwise. For example, if an agent asks a question, the probability of entering a multi-turn conversation is high. Embodiments described herein focus on generating features that are optimal to represent the task and generalize well to unseen data. Further, embodiments herein focus on choosing models that capture numerous ways an intention of requesting information or a response can be framed. Simply adopting an "is-question" classifier would miss utterances like "please specify the column you want to plot".

In an embodiment, to learn a classification task, an appropriate dataset is created to train the machine learning model. The dataset primarily distinguishes between two types of sentences in a conversation: those that expect a response (class 1) and those that do not expect a response (class 0). A class 0 utterance might be a remark, declarative statement, or sentiment from either the user or the chatbot that is not seeking information or making a request. Class 1 utterances do expect a response because they are asking a question or requesting to change the state of the system or world. For example, in the context of a conversation between a user and a loan agent, the user might request "Can I check the status of my loan application?" (class 1) and the agent could respond "Here is the information you requested" (class 0). However, identifying class 1 utterances may not always be as simple as checking if a sentence contains a question mark as other grammatical structures could be used. Examples may include the following: Who are the top borrowers? (i.e., WH-words e.g., Who, What, When, Where, Why, How questions); Are there any pending applications? Are the pending applications for manager 1 or manager 2? (i.e., yes-no or choice questions); I don't have any pending requests, right? (i.e., disjunctive or tag questions); Show me my submitted applications. (i.e., imperative tense verbs); I want/need to know the status of my request (i.e., imperative); Credit score, please (i.e., imperative); Yearly income? (i.e., other).

Furthermore, embodiments described herein may also consider the characteristics of a conversational environment (e.g., the user may not always provide grammatically correct sentences). Noisy data may include questions without question marks, incomplete sentences or phrases, or any other number of grammatical or spelling errors.

Embodiments described herein may also include encoding sentences into sentence embeddings using Siamese Bidirectional Encoder Representations from Transformers (BERT)-Networks with a pretrained BERT model (bert-base-nli-mean-tokens). For example, two different sets (e.g., base and compressed) of embeddings may be used to generate classifications. From the base pretrained model, a principle component analysis (PCA) method may be used to compress the default 768 dimension vector from BERT into dimensions of 100, 200, and 400.

In addition to creating the sentence embeddings, embodiments described herein are configured to capture the syntactic structure of the sentences using parts-of-speech (POS) tags because a model may be able to learn the pattern behind tags that invoke a response. For example, a natural language toolkit (NLTK)'s POS tagger may be used to create count and location features by comparing the frequency of occurrences as well as the location of the first appearance of a tag in the sentence. To calculate location, the distance of each word measured by its index from the center of the sentence may be divided by the length of the sentence. Location values closer to −1 are near the beginning of the sentence and values closer to 1 are near the end. Location values may be shifted by +1 to eliminate negative values as inputs to some feature selection algorithms that require non-negative inputs.

Embodiments described herein may include multiple feature selection algorithms to perform automatic feature selection. For example, Pearson correlation filtering, Chi-squared filtering, or Kullback-Leibler divergence may be used to perform automatic feature selection.

Embodiments described herein may include one or more models to choose from for a specific application based on certain application parameters. For example, application parameters may include complexity/simplicity of the problem, computational constraints (e.g., space and time) on training/testing, and problem characteristics (e.g., feature independence/dependence, amount of data noise, stochasticity, stationarity), among others. Each model may have a set of hyper-parameters that may be tuned to optimize training (e.g., feature mapping function, number of hidden neurons).

Embodiments described herein may include various types of machine learning models and techniques for training the machine learning models are used in improving intent determination in the messaging dialog manager system. For example, supervised learning techniques may be used on shallow models (e.g., SVM, k-nearest neighbor (kNN), random forest, decision tree, naïve Bayes) to serve as a baseline for comparison with deep learning models. Further, embodiments described herein may include performing grid search to fine-tune the hyper-parameters for SVM models, kNN models, or multi-later perceptron (MLP) models.

Embodiments described herein may include deep learning models to emulate the bidirectional-Long Short-Term Memory (LSTM) model to provide state of the art results for Natural Language Processing (NLP) tasks. For example, in a conversational environment, both the front and back halves of a sentence may be analyzed to provide the context to help in determining the meaning or intent of a sentence. Thus, a bidirectional-LSTM may provide improved results in analyzing the sentence in both front and back portions as opposed to a uni-directional LSTM.

Embodiments described herein use an array of datasets from conversational natural language literature to train the machine learning models. For a ground truth, the data may be annotated in a semiautomatic fashion to create a 45% (i.e., label: expecting-response)—55% (label: not-expecting-response) data split. For example, semiautomatic annotation may include identifying labels of data points on the source of data, wherein an example sentence (e.g., "A very, very, very slow-moving, aimless movie about a distressed, drifting young man") from a dataset that does not invoke a necessity of response to it in a multi-turn conversation would be labeled as such. Other sentences resembling the example sentence would be similarly labeled if they share the same properties and structure. Alternatively, another example sentence (e.g., "what was the last year where this team was a part of the usl a-league?") from the dataset that does invoke a necessity of response in a multi-turn conversation would be labeled as such.

Embodiments described herein may include training the machine learning models using a combination of pretrained BERT sentence embeddings and POS tags as input features to the machine learning models. For example, the input sentence embeddings may include dimensions of 768, 400, 200, or 100, scaling by a factor of approximately 2. Further, the sentence embeddings may be visualized in a 2-dimensional space by applying t-Distributed Stochastic Neighbor Embedding (t-SNE) with a perplexity of 50 on the 768-dimension sentence vectors. Further, 10-fold cross validation may be performed on the sentence vectors to report the train/validation performance.

Embodiments described herein may also include capturing more natural language structure from the sentences by appending POS tags (e.g., count, location) of the sentences to the feature set. By including the POS tags, the models realize an improved performance because the POS tags assist the model in learning the natural language sentence structures. Furthermore, aggregating all shadow model results and feature sets, the SVM-based classifier model results in the least bias and generalizes well on unseen data when trained on POS tag features and BERT sentence embeddings.

Embodiments described herein may include a bidirectional LSTM model on sentence embeddings of dimension 768, 400, 200 or 100. Sentence embeddings and POS tags may be included as the feature sets to the bidirectional LSTM model to generate satisfactory results indicating that the bidirectional LSTM model performs best with the addition of syntactic language features to the sentence embeddings.

Embodiments of the present invention recognize that a custom solution is desired for improving intent determination in a messaging dialog manager system in an efficient and convenient manner. Implementations of embodiments of the invention may take a variety of forms, and exemplary implementation details are discussed subsequently with reference to the Figures.

FIG. 1 depicts a block diagram of a distributed data processing environment for improving intent determination in a messaging dialog manager system, in accordance with an embodiment of the present invention. FIG. 1 provides only an illustration of one embodiment of the present invention and does not imply any limitations with regard to the environments in which different embodiments may be implemented. In the depicted embodiment, distributed data processing environment 100 includes user device 120, server 125, and database 124, interconnected over network 110. Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between user device 120, server 125, and database 124. Distributed data processing environment 100 may also include additional servers, computers, or other devices not shown.

The term "distributed" as used herein describes a computer system that includes multiple, physically distinct devices that operate together as a single computer system. Many modifications to the depicted environment may be made by those skilled in the art without departing from the scope of the invention as recited by the claims.

User device 120 may operate to execute at least a part of a computer program for improving intent determination in a messaging dialog manager system. In an embodiment, user device 120 may be configured to send and/or receive data from one or more of database 124 and server 125 via network 110. User device 120 may include user interface 122 configured to facilitate interaction between a user and user device 120. For example, user interface 122 may include a display as a mechanism to display data to a user and may be, for example, a touch screen, light emitting diode (LED) screen, or a liquid crystal display (LCD) screen. User interface 122 may also include a keypad or text entry device configured to receive alphanumeric entries from a user. User interface 122 may also include other peripheral components to further facilitate user interaction or data entry by user associated with user device 120.

In some embodiments, user device 120 may be a management server, a web server, or any other electronic device or computing system capable of receiving and sending data. In some embodiments, user device 120 may be a laptop computer, tablet computer, netbook computer, personal computer (PC), a desktop computer, a smart phone, or any programmable electronic device capable of communicating with database 124, server 125 via network 110. User device 120 may include components as described in further detail in FIG. 5.

Database 124 operates as a repository for data flowing to and from network 110. Examples of data include data corresponding to communications entered and received via user interface 122. A database is an organized collection of data. Database 124 can be implemented with any type of storage device capable of storing data and configuration files that can be accessed and utilized by user device 120, such as a database server, a hard disk drive, or a flash memory. In an embodiment, database 124 is accessed by user device 120 to store data corresponding to messaging communications with via user interface 122. In another embodiment, database 124 may reside elsewhere within distributed network environment 100 provided database 124 has access to network 110.

Server 125 can be a standalone computing device, a management server, a web server, or any other electronic device or computing system capable of receiving, sending, and processing data and capable of communicating with user device 120 and/or database 124 via network 110. In other embodiments, server 125 represents a server computing system utilizing multiple computers as a server system, such as a cloud computing environment. In yet other embodiments, server 125 represents a computing system utilizing clustered computers and components (e.g., database server computers, application server computers, etc.) that act as a single pool of seamless resources when accessed within distributed data processing environment 100. Server 125 may include components as described in further detail in FIG. 5.

Figure 2:
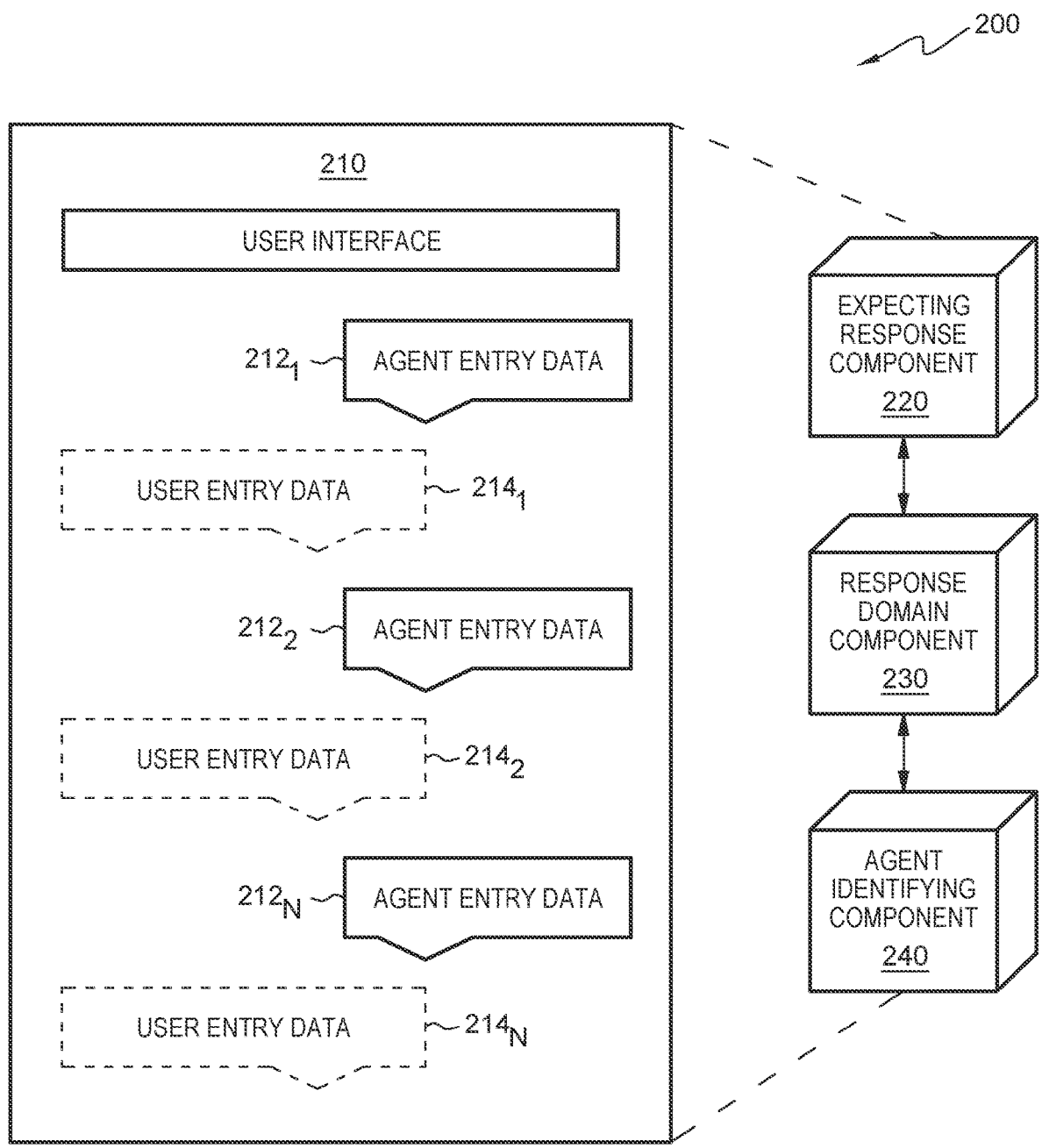
FIG. 2 depicts block diagram of a system for improving intent determination in a messaging dialog system, in accordance with an embodiment of the present invention.

FIG. 2 depicts a block diagram of a system 200 for improving intent determination in a messaging dialog system, in accordance with an embodiment of the present invention.

In an embodiment, system 200 may include one or more processors configured to to generate user interface 210 on a display of a computing device, such as user device 120 of FIG. 1. Further, system 200 may include one or more processors configured to generate a messaging dialog interface via user interface 210, wherein the messaging dialog interface may be configured to facilitate communications between a user and an agent (e.g., conversational agent, chatbot).

In an embodiment, system 200 may include one or more processors configured to receive agent entry data $212_{1-N}$ and user entry data $214_{1-N}$ within the messaging dialog interface to facilitate conversational or communicational flow between the user and the agent, in which N may represent any number of instances of agent entry data and user entry data. For example, one or more processors may be configured to receive first agent entry data $212_1$ and first user entry data $214_1$ in the messaging dialog interface (e.g., user interface 210). Entry data may include data corresponding to an event (e.g., a natural language phrase, non-natural language document entry). Additional agent entries and user entries may be exchanged within the messaging dialog interface to establish a conversational or communicational flow between the user and the agent to resemble a normal dialog. Conversational or communicational flow may be interrupted if the agent is not competent to response to a user entry, wherein the agent may respond with an error message or with an agent entry not consistent with what the user expects.

System 200 may be configured to use a Natural Language Processing (NLP) engine (not shown) to interpret entry data received in the messaging dialog executing within user interface 210. An NLP engine is a core component that interprets statements at any given time and converts the statements to structured inputs that the system can process. NLP engines may contain advanced machine learning algorithms to identify intent in user and agent statements and further matches user intent to a list of available actions supported by the chatbots residing within the system. For example, NLP engines may use either finite state automatic models or deep learning models to generate system-generated responses to user and agent statements. NLP engine may include an intent classifier and an entity extractor, wherein the intent classifier may be configured to interpret the natural language of a statement and the entity extractor may be configured to extract key information or keywords from the statement.

In an embodiment, system 200 may include one or more processors configured for identifying agent text data corresponding to a natural language (NL) text in the first agent entry data $212_1$. Further, the one or more processors may be configured for identifying user text data corresponding to a natural language (NL) utterance in the first user entry $214_1$. For example, an NLP engine may be configured to process the agent text data to identify NL text in the first agent entry and to process the user text data to identify NL text in the first user entry.

In an embodiment, system 200 may include expecting response component 220 configured for determining if agent entry data $212_{1-N}$ expects a response that is within a response domain. For example, expecting response component 220 may include one or more machine learning models configured to perform feature extraction on NL text entry data, and process the extracted features and the NL text entry data to determine a classification of whether the NL text entry data expects a response.

While the foregoing describes implementation of a machine learning model, the present disclosure is not limited thereto. In at least some embodiments, a machine learning model may implement a trained component or trained model configured to perform the processes described above. The trained component may include one or more machine learning models, including but not limited to, one or more classifiers, one or more neural networks, one or more probabilistic graphs, one or more decision trees, and others. In other embodiments, the trained component may include a rules-based engine, one or more statistical-based algorithms, one or more mapping functions or other types of functions/algorithms to determine whether a natural language input is a complex or non-complex natural language input. In some embodiments, the trained component may be configured to perform binary classification, where the natural language input may be classified into one of two classes/categories. In some embodiments, the trained component may be configured to perform multiclass or multinomial classification, where the natural language input may be classified into one of three or more classes/categories. In some embodiments, the trained component may be configured to perform multi-label classification, where the natural language input may be associated with more than one class/category.

Various machine learning techniques may be used to train and operate trained components to perform various processes described herein. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

In an embodiment, expecting response component 220 may further include one or processors configured for processing, by a first trained machine learning model, the agent text data to generate model output data corresponding to a response expectation classification; and determining the NL text as the first agent entry data that expects the response if the response expectation classification satisfies a condition. The response expectation classification may correspond to a first class (class 1) indicating that the entry data expects a response or a second class (class 0) indicating that the entry data does not expect a response. A class 0 entry data comprising a NL utterance might be a remark, declarative statement, or sentiment from either the user or the agent that is not seeking information or making a request. Class 1 NL utterances do expect a response because they are asking a question or requesting to change the state of the system or world. A condition may include a binary classification or a score corresponding to a binary classification.

In an embodiment, the first machine learning model may include a shallow model, as described above herein, wherein the shallow model is trained on various features (e.g., sentence embeddings, syntactic features) configured to generate model output data in response to receiving and processing NL text data. The model output data may include a binary classification indicating whether the NL text data expects a response or does not expect a response.

In an embodiment, the first machine learning model may include one or more of a shallow model or a deep learning model, as described above herein, wherein the shallow model and the deep learning models are trained on various features (e.g., sentence embeddings, syntactic features) configured to generate model output data in response to receiving and processing NL text data. The model output data may include a binary classification indicating whether the NL text data expects a response or does not expect a response. This determination improves the conversational experience in situations where digression or disambiguation occur.

In an embodiment, expecting response component 220 may further include one or processors configured for appending parts of speech (POS) tags to one or more words in the NL text to generate tagged NL text data. Further, expecting response component 220 may include one or more processors configured for encoding the agent text data into sentence embeddings having a dimension of 768 or less.

In an embodiment, expecting response component 220 may include one or more processors configured for processing, by a second trained machine learning model, the tagged NL text data and the sentence embeddings to generate model output data corresponding to a response expectation classification. Further, the one or more processors may be configured for determining the NL text as the first agent entry data that expects the response if the response expectation classification satisfies a condition.

In an embodiment, the first user entry may include a document entry, wherein the system 200 may further include one or more processors configured for extracting document entry data from the document entry and processing the document entry data to determine NL text data, wherein determining that the first user entry is not within the first response domain is based at least on the natural language text data.

In an embodiment, the one or more processors may be configured for comparing the first agent data entry topic and the first user entry topic to determine a similarity threshold is met. For example, if the first user entry topic is an appointment topic and the first agent data entry topic is a general help query topic, when the similarity threshold would not be met because the topics are not similar. As another example, if the first user entry topic is a reservation topic and the first agent data entry topic is also a reservation topic, when the similarity threshold would be met because the topics are the same.

In an embodiment, system 200 may include response domain component 230 configured for determining if a response is within a response domain. For example, response domain component 230 may include one or more processors configured for determining a first agent data entry topic based on the agent text data, wherein the first response domain corresponds to the first agent data entry topic. Further, response domain component 230 may include one or more processors configured for determining a first user entry topic based on the user text data. Further, response domain component 230 may include one or more processors configured for comparing the first agent data entry topic and the first user entry topic to determine a similarity threshold is met. For example, if the first agent data entry topic is determined to be a reservation topic based on the agent text data including a question about a reservation, and if the first user entry topic is determined to also be a reservation topic based on user text data including a statement about a reservation, then the similarity threshold may be satisfied because the first agent entry topic and the first user entry topic are the same. On the contrary, if the first agent entry topic is determined to be different from the first user entry topic, then the similarity threshold will not be satisfied.

In an embodiment, response domain component 230 may include one or more processors configured for determining that the first user entry is not within the first response domain based at least on determining that the similarity threshold does not exceed a predetermined value.

In an embodiment, system 200 may include agent identifying component 240 configured for identifying and communicating with an agent with a corresponding response domain that includes the received user entry data 214₁₋ₙ. For example, responsive to determining that the first user entry entered in the messaging dialog interface is not within the first response domain, agent identifying component 240 may be configured to identify a second agent configured with a second response domain that includes the first user entry.

In an embodiment, responsive to identifying the second agent, agent identifying component 240 may be configured for transmitting the first user entry to the second agent to facilitate a seamless transition of an established communicational flow between the first agent and a first user communicating in the messaging dialog interface. Furthermore, transmitting the first entry to the second agent may correspond to a digressed conversational flow between the first user and the second agent in the messaging dialog interface.

In an embodiment, digression data corresponding to determining that a digression has occurred may be communicated to an agent server configured to facilitate agent operations within the messaging dialog interface. The digression data may improve facilitating communications between agents and users configured to communicate within the messaging dialog interface such that user entries that are not relevant to agent entries will not impede the progress on the ongoing communication session. Rather, irrelevant user entries may be identified as digressions and the agent configured with the response domain to appropriately respond will be identified and carry on the digressed conversation.

In an embodiment, the one or more processors may include an NLP engine configured to interpret agent entry data 212₁₋ₙ or any other user entry into the messaging dialog executing in user interface 210 by processing the string of communications (e.g., NL text) and generating structured text containing keywords to be extracted and further processed.

Figure 3:
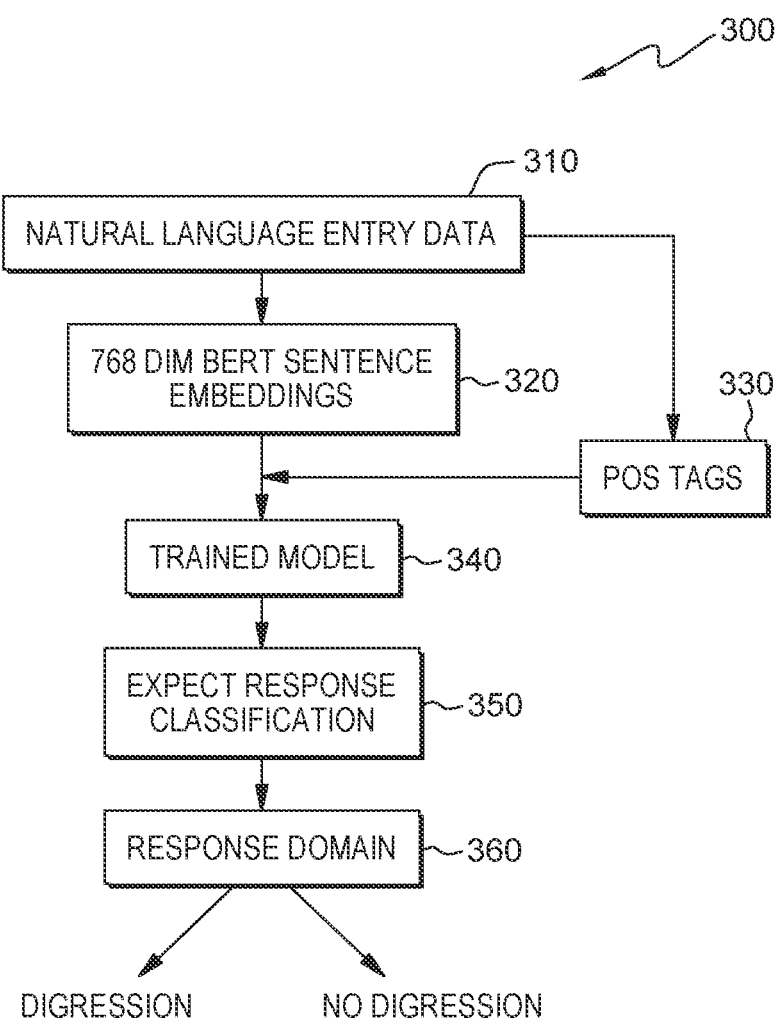
FIG. 3 depicts a model for improving intent determination in a messaging dialog manager system, in accordance with an embodiment of the present invention.

FIG. 3 depicts a model 300 for improving intent determination in a messaging dialog manager system, in accordance with an embodiment of the present invention.

In an embodiment, model 300 for improving intent determination in a messaging dialog manager system may be configured to receive natural language entry data 310 from one or more of an agent and a user. Further, model 300 may include one or more processors configured to encode agent text data, received as part of natural language entry data 310, into sentence embeddings 320 having a dimension of 768 or less. In other words, model 300 may be configured to convert natural language entry data 310 to 768-dimensional BERT sentence embeddings 320 as described above herein. Further, model 300 may be configured to append parts of speech (POS) tags 330 to one or more words in the NL text to generate tagged NL text data. Further, model 300 may include trained model 340 configured to process the NL tagged text data and the sentence embeddings 320 to generate output data corresponding to response expectation classification 350. Further, model 300 may include one or more processors configured to determine the NL text as the first agent entry data that expects the response if the response expectation classification satisfies a condition.

In an embodiment, model 300 may include response domain 360 configured to determine if a user entry is within a response domain of an agent entry. For example, response domain 360 may include one or more processors configures for determining a first agent data entry topic based on the agent text data, wherein the first response domain corresponds to the first agent data entry topic. Further, response domain 360 may include one or more processors configured for determining a first user entry topic based on the user text data and comparing the first agent data entry topic and the first user entry topic to determine a similarity threshold is met. If a comparison between the first agent data entry topic and the first user entry topic exceeds the similarity threshold, then the user entry is within the response domain of the agent entry. On the other hand, if a comparison between the first agent data entry topic and the first user entry topic does not exceed the similarity threshold, then the user entry is not within the response domain of the agent entry. If the user entry is not within the response domain of the agent entry, then the one or more processors may be configured to determine that a digression has occurred. If the user entry is within the response domain of the agent entry, then the one or more processors may be configured to determine that no digression has occurred.

In an embodiment, the computer-implemented method may further include determining that the first user entry is not within the first response domain is based at least on determining that the similarity threshold does not exceed a predetermined value.

Figure 4:
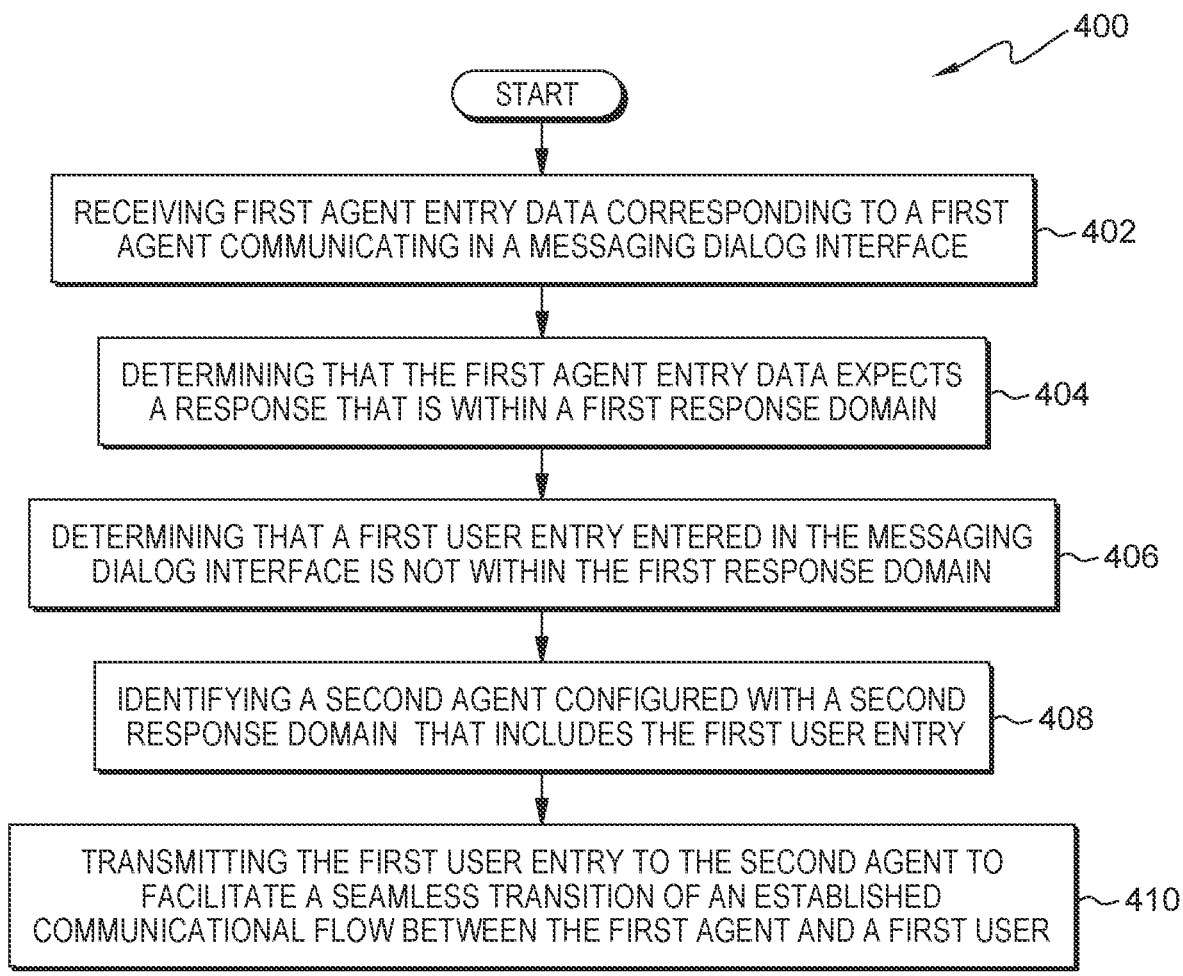
FIG. 4 depicts operational steps of a computer-implemented method for improving intent determination in a messaging dialog system, in accordance with an embodiment of the present invention.

FIG. 4 depicts operational steps of a computer-implemented method 400 for improving intent determination in a messaging dialog system, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computer-implemented method 400 for improving intent determination in a messaging dialog system may include one or more processors configured for receiving 402 first agent entry data corresponding to a first agent communicating in a messaging dialog interface.

In an embodiment, computer-implemented method 400 may further include one or more processors configured for identifying agent text data corresponding to a natural language (NL) text in the first agent entry data.

In an embodiment, computer-implemented method 400 may further include one or more processors configured for processing, by a first trained machine learning model, the agent text data to generate model output data corresponding to a response expectation classification.

Further, the one or more processors may be configured for determining the NL text as the first agent entry data that expects the response if the response expectation classification satisfies a condition.

Further, computer-implemented method 400 may further include one or more processors configured for identifying user text data corresponding to a natural language (NL) utterance in the first user entry.

In an embodiment, computer-implemented method 400 may further include one or more processors configured for determining a first agent data entry topic based on the agent text data, wherein the first response domain corresponds to the first agent data entry topic.

Further, computer-implemented method 400 may further include one or more processors configured for determining a first user entry topic based on the user text data.

Further, computer-implemented method 400 may further include one or more processors configured for comparing the first agent data entry topic and the first user entry topic to determine a similarity threshold is met.

Computer-implemented method 400 may also be configured for determining 404 that the first agent entry data expects a response that is within a first response domain.

In an embodiment, determining 404 that the first agent entry expects a response may further include one or more processors configured for appending parts of speech (POS) tags to one or more words in the NL text to generate tagged NL text data.

Further, the one or more processors may be configured for encoding the agent text data into sentence embeddings having a dimension of 768 or less.

Further, the one or more processors may be configured for processing, by a second trained machine learning model, the tagged NL text data and the sentence embeddings to generate model output data corresponding to a response expectation classification.

Further, the one or more processors may be configured for determining the NL text as the first agent entry data that expects the response if the response expectation classification satisfies a condition.

Computer-implemented method 400 may also be configured for determining 406 that a first user entry entered in the messaging dialog interface is not within the first response domain.

In an embodiment, computer-implemented method 400 may also include one or more processors configured for determining that the first user entry is not within the first response domain based at least on determining that the similarity threshold does not exceed a predetermined value.

Computer-implemented method 400 may also be configured for identifying 408 a second agent configured with a second response domain that includes the first user entry.

In an embodiment, the first user entry may include a document entry, wherein computer-implemented method 400 may further include one or more processors configured for extracting document entry data from the document entry.

Further, the one or more processors may be configured for processing the document entry data to determine natural language text data, wherein determining that the first user entry is not within the first response domain is based at least on the natural language text data.

In an embodiment, transmitting the first entry to the second agent may correspond to a digressed conversational flow between the first user and the second agent in the messaging dialog interface.

Computer-implemented method 400 may also be configured for transmitting 410 the first user entry to the second agent to facilitate a seamless transition of an established communicational flow between the first agent and a first user communicating in the messaging dialog interface.

Figure 5:
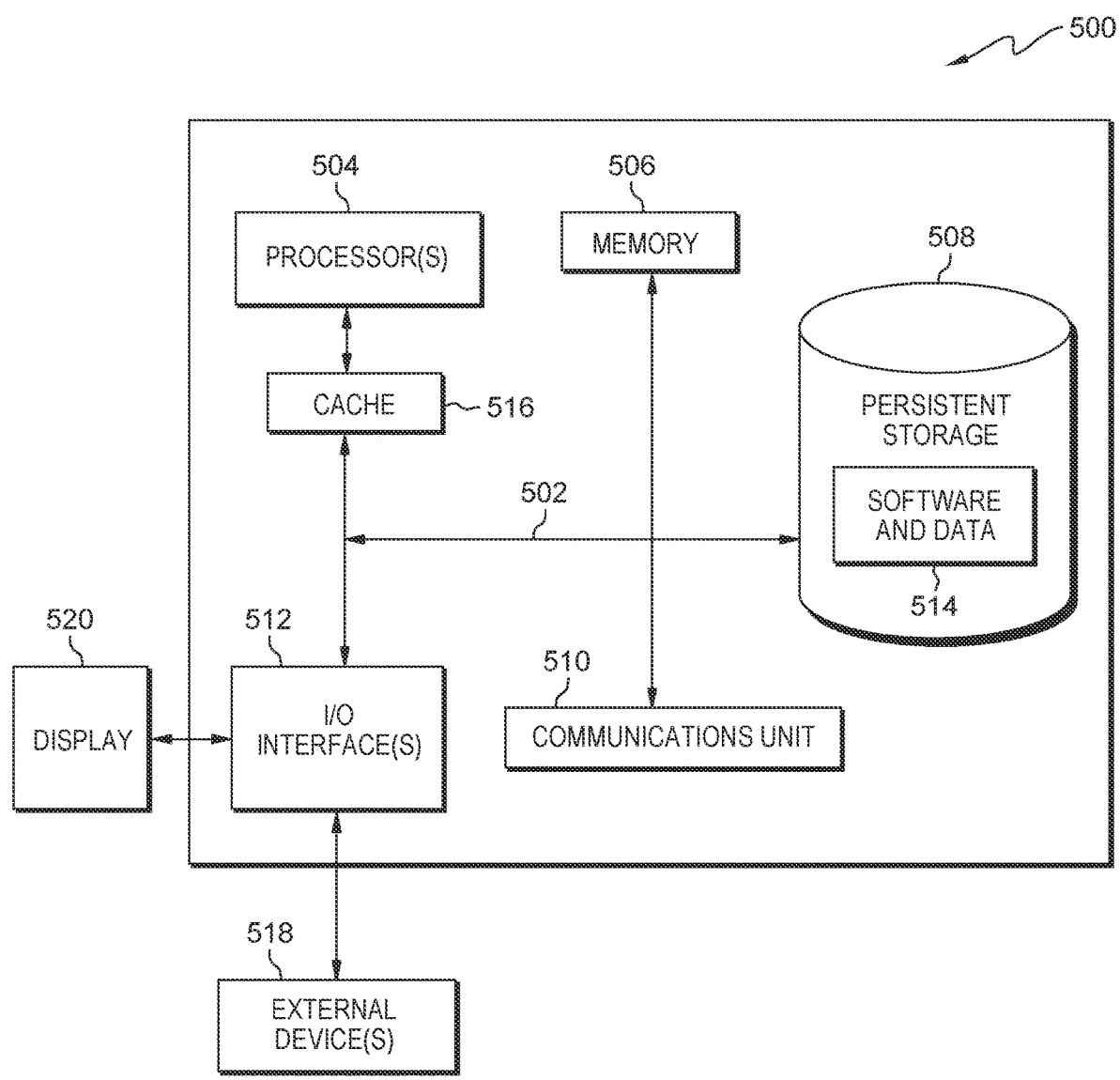
FIG. 5 depicts a block diagram of components of a server computer within the distributed data processing environment of FIG. 1, in accordance with an embodiment of the present invention.

FIG. 5 depicts a block diagram of components of the server computer within the distributed data processing environment of FIG. 1, in accordance with an embodiment of the present invention.

Computing device 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Programs may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Programs, as described herein, may be downloaded to persistent storage 508 through communications unit 510.

I/O interface(s) 512 allows for input and output of data with other devices that may be connected to user device 120.

For example, I/O interface 512 may provide a connection to external devices 518 such as image sensor, a keyboard, a keypad, a touch screen, and/or some other suitable input device. External devices 518 can also include portable computer readable storage media such as, for example, thumb drives, portable optical or magnetic disks, and memory cards. Software and data 514 used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

Software and data 514 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a computer system, a computer-implemented method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of computer-implemented methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for improving intent determination in a messaging dialog manager system, the computer-implemented method comprising:

receiving, by one or more processors, first agent entry data corresponding to a first agent communicating in a messaging dialog interface;

determining, by the one or more processors, that the first agent entry data expects a response that is within a first response domain, wherein the response includes one or more classes and a first class of the one or more classes corresponds to an expected response to the first agent entry data and a second class of the one or more classes corresponds to no response is expected to the first agent entry data;

determining, by the one or more processors, that a first user entry entered in the messaging dialog interface is not within the first response domain;

identifying, by the one or more processors, a second agent configured with a second response domain that includes the first user entry;

transmitting, by the one or more processors, the first user entry to the second agent to facilitate a seamless transition of an established communicational flow between the first agent and the first user;

identifying, by the one or more processors, agent text data corresponding to a natural language (NL) text in the first agent entry data;

identifying, by the one or more processors, user text data corresponding to a natural language (NL) utterance in the first user entry;

determining, by the one or more processors, a first agent data entry topic based on the agent text data, wherein the first response domain corresponds to the first agent data entry topic;

determining, by the one or more processors, a first user entry topic based on the user text data; and comparing, by the one or more processors, the first agent data entry topic and the first user entry topic to determine a similarity threshold is met.

2. The computer-implemented method of claim 1, wherein determining that the first user entry is not within the first response domain is based at least on determining that the similarity threshold does not exceed a predetermined value.

3. The computer-implemented method of claim 1, further comprising:

processing, by a first trained machine learning model, the agent text data to generate model output data corresponding to a response expectation classification; and determining, by the one or more processors, the NL text as the first agent entry data that expects the response if the response expectation classification satisfies a condition.

4. The computer-implemented method of claim 1, wherein the first user entry is a document entry, the computer-implemented method further comprising:

extracting, by the one or more processors, document entry data from the document entry;

processing, by the one or more processors, the document entry data to determine natural language text data, wherein determining that the first user entry is not within the first response domain is based at least on the natural language text data.

5. The computer-implemented method of claim 1, wherein transmitting the first entry to the second agent corresponds to a digressed conversational flow between the first user and the second agent in the messaging dialog interface.

6. The computer-implemented method of claim 1, wherein determining that the first agent entry expects the response further comprises:

appending, by the one or more processors, parts of speech (POS) tags to one or more words in the NL text to generate tagged NL text data;

encoding, by the one or more processors, the agent text data into sentence embeddings having a dimension of 768 or less;

processing, by a second trained machine learning model, the tagged NL text data and the sentence embeddings to generate model output data corresponding to a response expectation classification; and determining, by the one or more processors, the NL text as the first agent entry data that expects the response if the response expectation classification satisfies a condition.

7. A computer program product for improving intent determination in a messaging dialog manager system, the computer program product comprising:

one or more computer readable non-transitory storage media and program instructions collectively stored on the one or more computer readable non-transitory storage media, the stored program instructions comprising:

program instructions to receive first agent entry data corresponding to a first agent communicating in a messaging dialog interface;

program instructions to determine that the first agent entry data expects a response that is within a first response domain, wherein the response includes one or more classes and a first class of the one or more classes corresponds to an expected response to the first agent entry data and a second class of the one or more classes corresponds to no response is expected to the first agent entry data;

program instructions to determine that a first user entry received in the messaging dialog interface is not within the first response domain;

program instructions to identify a second agent configured with a second response domain that includes the first user entry;

program instructions to transmit the first user entry to the second agent to facilitate a seamless transition of an established communicational flow between the first agent and the first user;

program instructions to identify agent text data corresponding to a natural language (NL) text in the first agent entry data;

program instructions to identify user text data corresponding to a natural language (NL) utterance in the first user entry;

program instructions to determine a first agent data entry topic based on the agent text data, wherein the first response domain corresponds to the first agent data entry topic; and program instructions to determine a first user entry topic based on the user text data; and program instructions to compare the first agent data entry topic and the first user entry topic to determine a similarity threshold is met.

8. The computer program product of claim 7, wherein the program instructions to determine that the first user entry is not within the first response domain is based at least on program instructions to determine that the similarity threshold does not exceed a predetermined value.

9. The computer program product of claim 7, further comprising:

program instructions to process, by a first trained machine learning model, the agent text data to generate model output data corresponding to a response expectation classification; and program instructions to determine, by the one or more processors, the NL text as the first agent entry data that expects the response if the response expectation classification satisfies a condition.

10. The computer program product of claim 7, wherein the first user entry is a document entry, the computer program product further comprising:

program instructions to extract document entry data from the document entry; and program instructions to process the document entry data to determine natural language text data, wherein the program instructions to determine that the first user entry is not within the first response domain is based at least on the natural language text data.

11. The computer program product of claim 7, wherein the program instructions to transmit the first entry to the second agent corresponds to a digressed conversational flow between the first user and the second agent in the messaging dialog interface.

12. The computer program product of claim 7, wherein the program instructions to determine that the first agent entry expects the response further comprises:

program instructions to append parts of speech (POS) tags to one or more words in the NL text to generate tagged NL text data;

program instructions to encode the agent text data into sentence embeddings having a dimension of 768 or less;

program instructions to process, by a second trained machine learning model, the tagged NL text data and the sentence embeddings to generate model output data corresponding to a response expectation classification; and program instructions to determine the NL text as the first agent entry data that expects the response if the response expectation classification satisfies a condition.

13. A computer system for improving intent determination in a messaging dialog manager system, the computer system comprising:

one or more computer processors;

one or more non-transitory computer readable storage media;

program instructions collectively stored on the one or more non-transitory computer readable storage media for execution by at least one of the one or more computer processors, the stored program instructions comprising:

program instructions to receive first agent entry data corresponding to a first agent communicating in a messaging dialog interface;

program instructions to determine that the first agent entry data expects a response that is within a first response domain, wherein the response includes one or more classes and a first class of the one or more classes corresponds to an expected response to the first agent entry data and a second class of the one or more classes corresponds to no response is expected to the first agent entry data;

program instructions to determine that a first user entry received in the messaging dialog interface is not within the first response domain;

program instructions to identify a second agent configured with a second response domain that includes the first user entry;

program instructions to transmit the first user entry to the second agent to facilitate a seamless transition of an established communicational flow between the first agent and the first user communicating;

program instructions to identify agent text data corresponding to a natural language (NL) text in the first agent entry data;

program instructions to identify user text data corresponding to a natural language (NL) utterance in the first user entry;

program instructions to determine a first agent data entry topic based on the agent text data, wherein the first response domain corresponds to the first agent data entry topic;

program instructions to determine a first user entry topic based on the user text data; and program instructions to compare the first agent data entry topic and the first user entry topic to determine a similarity threshold is met.

14. The computer system of claim 13, wherein the program instructions to determine that the first user entry is not within the first response domain is based at least on program instructions to determine that the similarity threshold does not exceed a predetermined value.

15. The computer system of claim 13, further comprising:
program instructions to process, by a first trained machine learning model, the agent text data to generate model output data corresponding to a response expectation classification; and
program instructions to determine, by the one or more processors, the NL text as the first agent entry data that expects the response if the response expectation classification satisfies a condition.

16. The computer system of claim 13, wherein the first user entry is a document entry, the computer system further comprising:
program instructions to extract document entry data from the document entry; and
program instructions to process the document entry data to determine natural language text data, wherein the program instructions to determine that the first user entry is not within the first response domain is based at least on the natural language text data.

17. The computer system of claim 13, wherein the program instructions to transmit the first entry to the second agent corresponds to a digressed conversational flow between the first user and the second agent in the messaging dialog interface.

18. The computer system of claim 13, wherein the program instructions to determine that the first agent entry expects the response further comprises:
program instructions to append parts of speech (POS) tags to one or more words in the NL text to generate tagged NL text data; and
program instructions to encode the agent text data into sentence embeddings having a dimension of 768 or less.

19. The computer system of claim 18, further comprising:
program instructions to process, by a second trained machine learning model, the tagged NL text data and the sentence embeddings to generate model output data corresponding to a response expectation classification; and
program instructions to determine the NL text as the first agent entry data that expects the response if the response expectation classification satisfies a condition.

* * * * *